No. 667,920. Patented Feb. 12, 1901.
C. A. PERKINS.
BICYCLE DYNAMOMETER.
(Application filed May 13, 1896.)
(No Model.) 2 Sheets—Sheet 1.

Witnesses. Inventor.
Chas A Perkins

No. 667,920. Patented Feb. 12, 1901.
C. A. PERKINS.
BICYCLE DYNAMOMETER.
(Application filed May 13, 1896.)

(No Model.) 2 Sheets—Sheet 2.

Witnesses:
J. K. McColl.
Jno. B. Gunn

Inventor:
Chas. A. Perkins

UNITED STATES PATENT OFFICE.

CHARLES A. PERKINS, OF KNOXVILLE, TENNESSEE.

BICYCLE-DYNAMOMETER.

SPECIFICATION forming part of Letters Patent No. 667,920, dated February 12, 1901.

Application filed May 13, 1896. Serial No. 591,437. (No model.)

*To all whom it may concern:*

Be it known that I, CHARLES A. PERKINS, a citizen of the United States, residing at Knoxville, in the county of Knox and State of Tennessee, have invented a new and useful Improvement in Dynamometers, of which the following is a specification, reference being had to the accompanying drawings, forming a part thereof.

This invention relates to a means for determining the force applied to a machine or the work or energy required to drive a machine, and more particularly the class of mechanism known as "crank-driven" machines; but its application, in a broader sense, to bicycles or other velocipedes or vehicles, whether crank-driven or otherwise, is intended, as is hereinafter clearly set forth.

I am aware that dynamometers have been used on a crank-driven mechanism, as the bicycle, of such construction as to measure the direct thrust of the leg, which does not, however, determine the amount of work necessary to drive the machine. Such dynamometers only indicate the total work or force expended by the rider, a large portion of which is useless and only tends to bend the pedal center or shaft and otherwise harmfully distort the driving mechanism. My invention measures only the useful component of the leg-thrust—that is, the component tangential to the circle of revolution of the point of thrust on the pedal. It might also be used to measure the tangential component of the driving force at any other radius by changing the point of attachment of the necessary part of the instrument anywhere along the crank or driving arm or extension of the same.

Though the principle and use of my dynamometer are applicable in a large variety of forms, such as to measure force or work or, in fact, any desirable functions or forms of energy, I have embodied the various essential features in a construction which shows a convenient and practical use of the same, and which I hereinafter more fully describe in reference to the drawings, in which—

Figure 1:
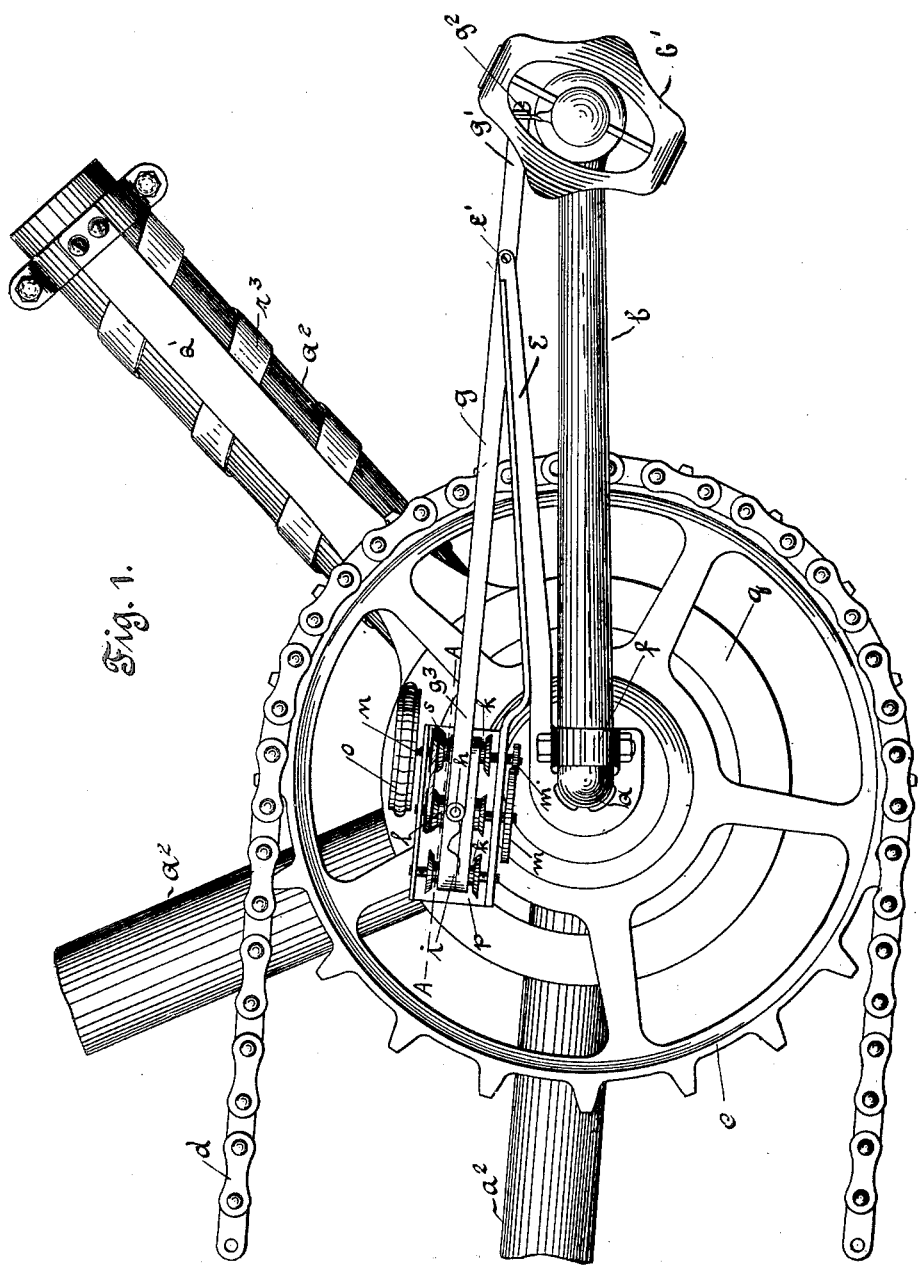
Figure 3:
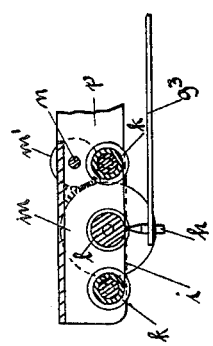
Figure 2:
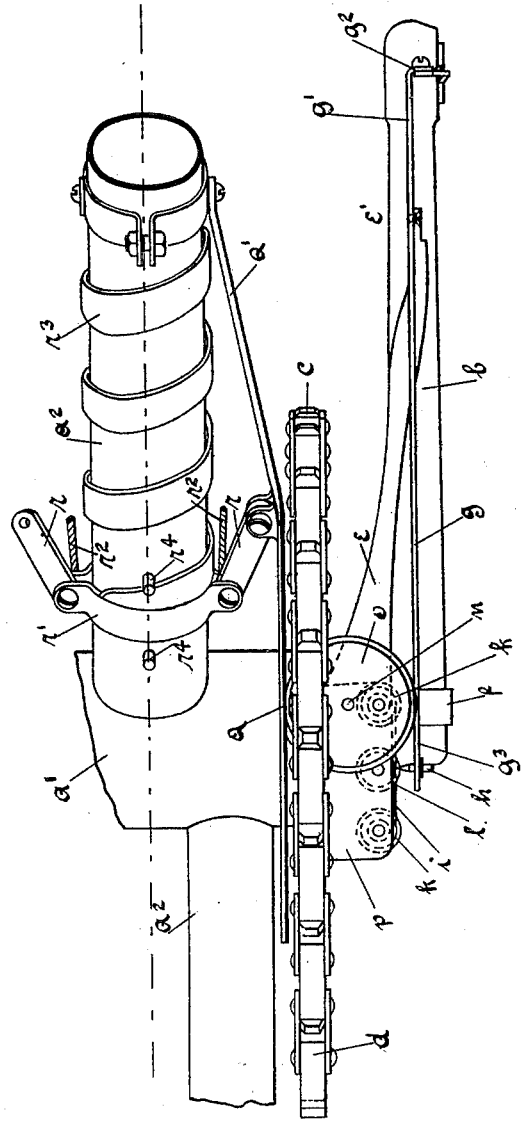

Figure 1 is a side elevation of the dynamometer as attached to the driving mechanism of a velocipede. Fig. 2 is a plan view of one-half of the driving mechanism of a velocipede with the dynamometer shown as attached to the crank. Fig. 3 is a plan of part section on line A A, Fig. 1, showing a recording means.

That portion of a safety-bicycle which carries the driving-shaft and its mechanism is shown in the drawings with the driving-shaft $a$ and crank-hanger $a'$, with the tubular members of the bicycle-frame $a^2$ $a^2$ $a^2$ connected therewith. These, with an ordinary crank $b$ and pedal $b'$ and sprocket-wheel $c$ and chain $d$, do not differ materially from usual bicycle construction. A steel ring $f$ is shrunk or screwed to the crank near its butt and rigidly carries a fixed arm $e$, whose outer end $e'$ acts as a fulcrum for the lever $g$. A steel link $g^2$ is at one end firmly attached to the crank by being screwed between pedal and crank. At the other end the link is attached to the end $g'$ of the lever, whereby $g'$ is maintained always at a definite distance from the end of the crank, and any motion of the outer end of the crank relative to its inner or clamped end is transmitted to the end $g'$ of the lever. The lever at its other end $g^3$ carries a pencil or marker $h$, which rests upon a recording slip or tape $i$, passing immediately under it. This tape $i$ is carried on the spools $k$ $k$ and moved by the drum $l$, which is operated through the small gears $m$ $m'$ and shaft $n$ by the roller $o$, all of these being mounted on a frame $p$, which is rigidly connected with the fixed arm E, and therefore with the butt of the crank, and also rigidly supported relative to the shaft $a$. The annular disk $q$ has a pan-handle or flexible arm Q', attached to tube $a^2$. A collar $r'$ on tube $a^2$ carries one end of the toggle-links $r$, the other end of $r$ going to the annular disk $q$. By means of the cords $r^2$, running to the hands of the rider and attached to collar $r'$, said collar may be drawn longitudinally along the tube until it strikes a pin $r^4$. When this is done, the toggle-link will press the annular disk $q$ against the roller $o$ and cause the recording-tape to be carried forward. The spring $r^3$ brings the collar to its original position against the other pin $r^4$, thus stopping the motion of the tape whenever the tension on the cord $r^2$ is relieved. One of the toggle-links $r$ is shown as connected to collar $r'$ and annular disk $q$. The second toggle $r$ is attached similarly to collar $r'$ and at its outer end to a second disk on the other side of bicycle (not shown in the figure) belonging to a second dynamometer.

The operation of the dynamometer will be readily understood as follows: As the crank and attached parts are carried around by the foot of the rider the roller $o$ is rotated by rolling on the annular disk $q$, driving the shaft $n$, the gears $m'$ and $m$, and the drum $l$, and therefore the tape $i$, which rolls from one of the spools $k$ to the other under the pencil-point $h$. One of these spools $k$ is lightly belted to the drum $l$ by the cord $s$, whereby the slack in the tape as it leaves the drum is wound upon said spool. This pencil-point being attached to lever or recording arm $g$ is moved across the drum $l$ in a direction parallel with its axis in amounts proportionate to the force tending to drive the crank and therefore the shaft $a$. It will be obvious that by means of the cords $r^2$ and spring $r^3$ the annular disk can be thrown in or out of engagement with the recording apparatus at will of the rider, and the latter can easily take a continuous record of the force he has exerted in driving the bicycle for any desired period, or by computation the work and energy which has been necessary to drive the bicycle can be determined.

The horse-power or work necessary to drive such mechanism in a given time is of course a function of the force applied, the distance, and the time. This applied force is in proportion to the magnitude of the deflection of the driving-crank, which we may term a "flexible" crank or the "driving" member, and the recording-tape moving at a speed in proportion to the speed of the machine the line drawn by the pencil will have as coördinates the tangential components of the force and the distance traveled, and the area between this curve and the line of zero-pressure will represent the work done for any distance, and by dividing by the time observed independently the result obtained will be power. For these purposes the tape must of course be calibrated, and as the deflection of the flexible cranks will vary in ones of different weights and section the calibration should be made for every crank used, and this would be imperative for extreme accuracy, because of discrepancies in the quality of material in the crank or temper of the same, even should they be of equal weight and section. The point of attachment to the crank of the recording-arm $g$, as shown in Fig. 2, is at a distance from the driving-shaft practically equal to the length of the power-arm or, in other words, at equal radius from the driving-shaft axis with the point of application of the power, and therefore the record on the tape will be with the usual calibration of the same an absolute index of the tangential component of the applied force. The calibration of the tape is accomplished by any usual means and might consist, essentially, in hanging known weights on the end of the crank when the same is absolutely horizontal and noting the deflection of the pencil-point resulting. By moving the point of connection of the end $g'$ of the arm $g$ to the crank toward or away from the driving-shaft a lesser or greater deflection of the outer end $g'$ of the arm $g$ can be obtained as might be desired for convenience. Under these circumstances the record, more properly speaking, is a record of the torque and not of the absolute tangential component of the force applied. Thus it will be seen that for determining the work and energy the torque is the function recorded; but for special reasons it may be desirable to record and read from the scale on the tape the absolute tangential force applied, which can be done.

Though I believe the flexible-crank dynamometer is herein described for the first time, I claim its application for any crank-driven machine, and I believe that any means, whether by a flexible crank or by a loosely-mounted sprocket or crank and other variations of the same applied to a velocipede, has never been used heretofore, but that all measurements have been the erroneous measurement of the force applied, and not the force which actually operated to drive the machine. The proportion of this latter force to the total applied force would depend entirely upon the skill of the operator in the case of a bicycle.

It is evident that the function of the lever or recording arm $g$ is simply to multiply or magnify the elastic displacement of the driving-crank. While I have shown a lever as the preferred construction, I do not wish to be limited in this respect.

Having fully described my invention and the various modifications of which it is susceptible, what I claim, and desire to secure by Letters Patent, is—

As a dynamograph for bicycles which have more or less flexible crank-arms whereby the outer end of each arm has, under the impelling force applied to it, a movement with relation to the inner end due to the flexure of the arm, the combination with such an arm, of a pencil, connections between the same and the outer end of said arm whereby the pencil is caused to move in a fixed relation to the movement due to flexure, a tracing-paper, and means for supporting the same in contact with the pencil-point and for imparting thereto a movement relative to said point in a direction substantially transverse to that of the movement of said point and at a rate proportional to the angular movement of the crank, substantially as described.

CHARLES A. PERKINS.

Witnesses:
J. B. GUINN,
J. R. MCCALL.